United States Patent [19]
Langer et al.

[11] Patent Number: 5,794,055
[45] Date of Patent: Aug. 11, 1998

[54] AUTOMOTIVE ELECTRICAL SYSTEM AND METHOD FOR COUPLING POWER TO SUCH SYSTEMS

[75] Inventors: Peter Langer, Troy; Mark Stanley Pikula, Dearborn; Richard Alan Kraus, Farmington Hills; Hyung Kim, Bloomfield Hills, all of Mich.

[73] Assignee: Ford Motor Company, Dearborn, Mich.

[21] Appl. No.: 509,475

[22] Filed: Jul. 31, 1995

[51] Int. Cl.⁶ .................................................. G06F 1/30
[52] U.S. Cl. ............................................... 395/750.01
[58] Field of Search .................... 395/750, 750.01–6; 364/707

[56] References Cited

U.S. PATENT DOCUMENTS

| | | |
|---|---|---|
| 4,381,552 | 4/1983 | Nocilini et al. . |
| 4,455,623 | 6/1984 | Wesemeyer et al. . |
| 4,698,748 | 10/1987 | Juzswik et al. . |
| 4,839,530 | 6/1989 | Greenwood . |
| 4,965,550 | 10/1990 | Wroblewski . |
| 5,073,943 | 12/1991 | Chapman . |
| 5,166,661 | 11/1992 | Chen . |
| 5,192,873 | 3/1993 | Wrenbeck et al. ................. 307/38 |
| 5,196,728 | 3/1993 | Jaux . |
| 5,239,520 | 8/1993 | Arnold . |
| 5,305,316 | 4/1994 | Yoshida et al. ................ 370/85.1 |
| 5,305,459 | 4/1994 | Rydel . |
| 5,351,041 | 9/1994 | Ikata et al. . |
| 5,361,364 | 11/1994 | Nagashige et al. . |
| 5,526,267 | 6/1996 | Sogawa ........................ 364/431.11 |
| 5,598,039 | 1/1997 | Weber ............................. 307/38 |

*Primary Examiner*—Ayaz R. Sheikh
*Assistant Examiner*—David A. Wiley
*Attorney, Agent, or Firm*—Paul K. Godwin

[57] ABSTRACT

An automotive electrical system and method for coupling power to such a system in which current cumulatively drawn by the various modules of the system during its inactive state is minimized. In one aspect of the invention, the electrical system (10) comprises at least one remote module (14a–n) coupled to a power bus (21) and a signal bus (16), at least one of the remote modules (14a–n) is coupled to at least one wake-up input switch (28A–I); a central module (12) coupled to the remote module (14a–n) by the signal bus (16), the central module (12) coupling electrical power from a power source (20) to the power bus (21) in response to a detection of an activation of any of the wake-up input switches (28A–I). In another aspect of the invention, a method for awakening an automotive electrical system (10) from an inactive state, the electrical system (10) having a central module (12) for coupling power from a power source (20) to a power bus (21), at least one remote module (14a–n) coupled to the power bus (21), and the remote module (14a–n) coupled to at least one wake-up input switch (28A–I), the method comprising the steps of: generating a current transient upon activation of the wake-up input switch (28A–I), sensing the current transient, generating a power control signal in response to the sensed current transient and coupling power to the power bus (21) in response to the power control signal.

18 Claims, 4 Drawing Sheets

AUTOMOTIVE ELECTRICAL SYSTEM AND METHOD FOR COUPLING POWER TO SUCH SYSTEMS

BACKGROUND OF THE INVENTION

The present invention relates generally to automotive electrical systems and more particularly to low power consumption circuitry for controlling the distribution of power in such systems.

The electrical system in today's automobile is called on to monitor and control a plethora of vehicle convenience, safety and operating functions. Typically these functions are partitioned and performed by numerous multiplexed control modules distributed throughout the vehicle. While these modules may be physically remote from each other, they eventually all derive their electrical power from a common limited source: the vehicle battery. Because an unlimited power source is not available to perform these various functions, power management to prevent premature discharge of the vehicle battery is a key design consideration.

Many schemes have been developed in the past to minimize current drain and conserve battery power by providing a sleep or inactive state for the system. For example, U.S. Pat. No. 4,839,530 provides an electrical system in which a plurality of slave units are connected to a master central unit by a signalling link. Activation of the master unit upon closure of an activation switch connected to a slave module is provided by temporarily applying an activation voltage level different from the active mode operation voltage on a signalling link. To generate this activation voltage, each slave unit capable of activating the system has activation voltage drive means that connect to corresponding power supply control means in the master central unit. Direct and continuous battery connections are made not only to each activation drive means located in the slave units, but also to any slave units that are coupled to high current loads.

The inventors herein have recognized a number of problems and disadvantages associated with this prior art approach. For example, any slave module that has activation voltage drive circuitry or an associated high current load coupled directly to the vehicle battery may draw an undesirable amount of leakage current from the battery. The cumulative current draw from the battery will obviously magnify as the number of slave modules increases. Also, should an activation switch become stuck in a closed position, the system would continually remain in the active mode drawing current from the battery at its normal operating level thereby defeating the purpose of the voltage activation circuitry.

SUMMARY OF THE INVENTION

An object of the invention herein is to manage power distribution in an automotive electrical system to minimize current cumulatively drawn by the various modules of the system during its inactive state.

The above object is achieved, and problems of prior approaches overcome, by providing both an electrical system for an automobile and a method for coupling power to an electrical system in an automobile. On one aspect of the invention, the electrical system comprises: at least one remote module coupled to a power bus and a signal bus, at least one of the remote modules is coupled to at least one wake-up input switch; a central module coupled to the remote module by a signal bus, the central module coupling electrical power from a power source to the power bus in response to a detection of an activation of any of the wake-up input switches. Preferably the remote module further includes wake-up input switch interface means interposed between the wake-up input switch and the signal bus for generating a current transient in response to the activation of the wake-up input switch and the central module further includes central controller means responsive to the sensing means for controlling distribution of the electrical power to the power bus.

In another aspect of the invention, a method for awakening an automotive electrical system from an inactive state, the electrical system having a central module for coupling power from a power source to a power bus, at least one remote module coupled to the power bus, and the remote module coupled to at least one wake-up input switch, the method comprising the steps of: generating a current transient upon activation of the wake-up input switch; sensing the current transient, generating a power control signal in response to the sensed current transient and coupling power to the power bus in response to the power control signal. Preferably, the method wherein the automotive electrical system enters the inactive state comprises the steps of generating a sleep request for each remote module; receiving the sleep request from each remote module at the central module; and decoupling power from the power bus in response to receiving the sleep request from each remote module.

An advantage of the above aspects of the invention is that when power is decoupled from the power bus, no current is drawn by circuitry connected to the power bus. Still another advantage is that a stuck switch will not disable the system from entering an inactive state. Finally, the cumulative current drain from the battery by the electrical system in its inactive state is minimized.

BRIEF DESCRIPTION OF THE DRAWINGS

The above object and advantages of the invention will be more clearly understood by reading an example of an embodiment in which the invention is used to advantage with reference to the attached drawings wherein like numerals refer to like parts and wherein.

DETAILED DESCRIPTION OF THE PREFERRED EMBODIMENT

Figure 1:
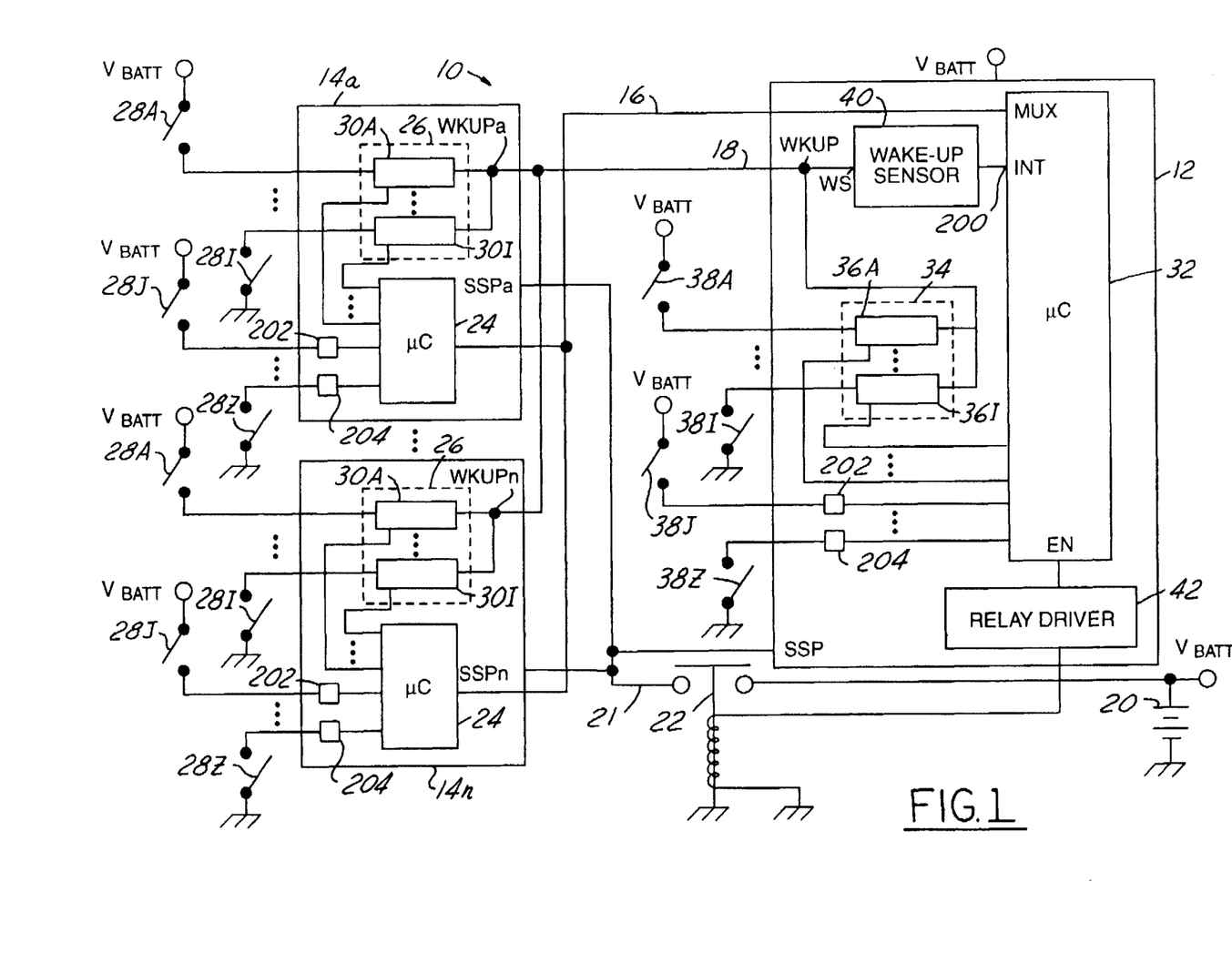
FIG. 1 is a block diagram of an embodiment wherein the invention is used to advantage.

Referring first to FIG. 1, automotive electrical system 10 is shown with central power control module 12 and "n" number of remote modules 14a–n. Power control module 12 and remote modules 14a–n are packaged in convenient locations throughout the vehicle for controlling various vehicle functions such as controlling windows, door locks, seats, lighting, etc. A data bus, such as serial communication link 16, networks power control module 12 and remote modules 14a–n and allows for the transfer of data among the modules in performing their specified tasks. Power control module 12 and remote modules 14a–n are also interconnected as shown in FIG. 1 by wake-up signal bus 18 which will be described later herein.

Electrical system 10 in the present example is powered by a conventional vehicle power source such as battery 20 which may be coupled to a charging system and distributed to various electrical loads through a power distribution block (not shown) as is commonly known by those of ordinary skill in the automotive arts. The voltage of the battery $V_{BATT}$ is typically in the range of 12 volts to 14 volts.

As schematically shown in FIG. 1, power control module 12 is coupled directly to battery 20 for a constant source of battery voltage $V_{BATT}$ and to switch system power bus 21 at terminal SSP for a selectable source of power. In contrast, power to remote modules 14a–n is provided only at respective terminals SSPa–SSPn from battery 20 via switch system power bus 21 which connects to a solid state switch or relay, such as power relay 22. Once battery power is delivered to modules 12 and 14a–n through their respective power terminal $V_{BATT}$ or respective switch system power terminal SSPa–SSPn, it is distributed in a known way to the various internal circuits; e.g., 5 volt regulators to power on board integrated circuits, etc.

Power relay 22 is responsive to a command signal from power control module 12. Accordingly, electrical system 10 generally has two states of operation: an active state defined when power relay 22 is closed so that power is supplied to the electronics and voltage sources for the loads of all modules, and a sleep state defined when power relay 22 is open so that no power is supplied to any of the modules, except for the portion of power control module 12 which is powered by the constant source of battery voltage $V_{BATT}$. As a result of this configuration, minimal current is drawn from battery 20 when electrical system 10 is in the sleep state.

Continuing with FIG. 1, remote module 14a is now described. It being understood that the description is applicable to the other "n" modules wherein like numerals refer to like parts of module 14a. Remote module 14a has a remote microcontroller 24, such as Texas Instruments TMS370, a wake-up input switch interface 26 and a plurality of momentary, normally-open input switches 28A–Z. As shown in FIG. 1, the input switches for remote module 14a may be divided into any combination of wake-up inputs 28A–I which are intended to awaken electrical system 10 from the sleep mode versus nonwake-up inputs 28J–Z which are only responded to when electrical system 10 is in the active or awaken state. Similarly, the input switches for each remote module 14a may also be divided into any combination of switch to battery (as for example switch 28A) or switch to ground (see switch 28I) configurations.

Obviously the number of input switches and the switch configuration will vary depending on the type of monitoring required by remote microcontroller 24 to perform the desired vehicle function. For example, remote module 14a may be a driver door module for controlling vehicle door locks and the driver's seat position. Such a module may have five switch to ground wake-up input switches which correspond to the key pads of a keyless entry system and two switch to ground nonwake-up inputs corresponding to the seat position memory seats for the driver seat. The combinations and permutations of modules and inputs are simply too numerous to list here.

Continuing with FIG. 1, each input switch 28A–Z is connected to an input port of its respective microcontroller 24 in remote modules 14a–n. Accordingly, when electrical system 10 is in the active state, each remote microcontroller 24 of respective remote modules 14a–n monitors its respective inputs and executes according to its normal operating strategy. Additionally, each wake-up input switch 28A–I also connects to its respective wake-up input switch interface 26 in its respective remote module 14a–n. As shown in FIG. 1, wake-up input switch interfaces 26 are preferably divided into a plurality of subcircuits depending upon the number of wake-up input switches and their respective configurations. For example, switch to battery wake-up input switch 28A connects to switch to battery wake-up input circuit 30A, and switch to ground wake-up input switch 28I connects to a switch to ground wake-up input circuit 30I. The outputs of subcircuits 30A–I are electrically coupled to wake-up signal bus 18 at respective wake-up terminals WKUPa–n of remote modules 14a–n. Therefore, on a system level, all wake-up input switches 28A–Z are electrically in parallel with each other.

Similar to remote modules 14a–n, power control module 12 includes microcontroller 32 such as Texas Instruments TMS370, wake-up input 34 interface with respective wake-up input circuits 36A–I. In the present embodiment, power control module 12 also includes a plurality of normally-open input switches 38A–Z.

As with remote modules 14a–n, input switches 38A–Z may be divided into any combination of wake-up inputs 38A–I versus nonwake-up inputs 38J–Z, and switch to battery (see switch 38A) or switch to ground (see switch 38I) configurations. Also, the outputs of input circuits 36A–I similarly connect to wake-up signal bus 18 at node WKUP so that all wake-up input switches 38A–Z and 28A–Z are electrically in parallel.

Also in the presently described embodiment, power control module 12 further includes wake-up sensor 40 and power relay driver 42 for controlling the operation of power relay 22. In such a configuration, power control module 12 not only performs specific vehicle tasks similar to remote modules 14a–n by monitoring its own local input switches 38A–Z, but it also has the capability to control power to remote modules 14a–n by monitoring its wake-up signal bus 18 via terminal WS.

Together, wake-up input switch interfaces 26 and 34, wake-up signal bus 18 and wake-up sensor 40 create the system wake-up interface for waking automobile electrical system 10 from the inactive or sleep state in response to a manual activation of one of the wake-up input switches 28A–28I or 38A–I. This interface will now be described in greater detail with particular reference to FIGS. 2–4.

Figure 2:
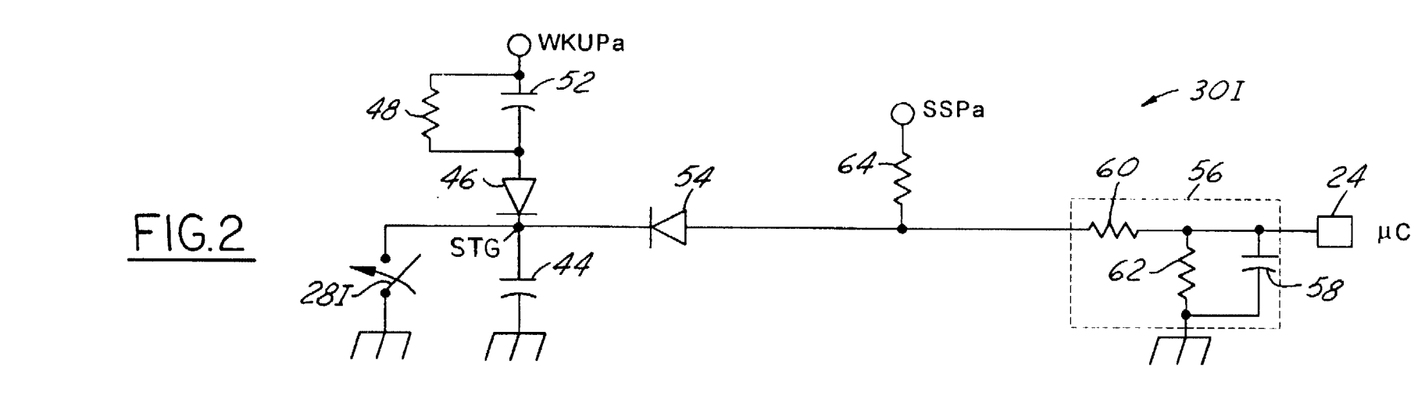
FIGS. 2–4 are schematic diagrams of portions of the embodiment shown in FIG. 1.

Each switch to ground wake-up input circuit 30I and 36I has an input terminal STG that is connected to a switch to ground wake-up input switch such as 28I or 38I. Since all switch to ground wake-up input circuits will operate the same and have the same circuit components, only switch to ground wake-up input circuit 30I for remote module 14a is shown in FIG. 2 and will be described herein.

RF filtering capacitor 44 is connected in parallel with switch to ground wake-up input switch 28I. Blocking diode 46 is in series between terminal STG and resistor 48 which connects to wake-up signal bus 18 at wake25 up terminal WKUPa. Capacitor 52 is connected in parallel with resistor 48. Blocking diode 54 is in series between terminal STG and signal conditioner 56 whose output connects to an input port of microcontroller 24. As shown in FIG. 2, signal conditioner 56 consists of a low-pass filter in combination with a voltage divider network comprising capacitor 58 and resistors 60 and 62. Switch system power terminal SSPa connects to the anode of blocking diode 54 via pull-up resistor 64.

Figure 3:
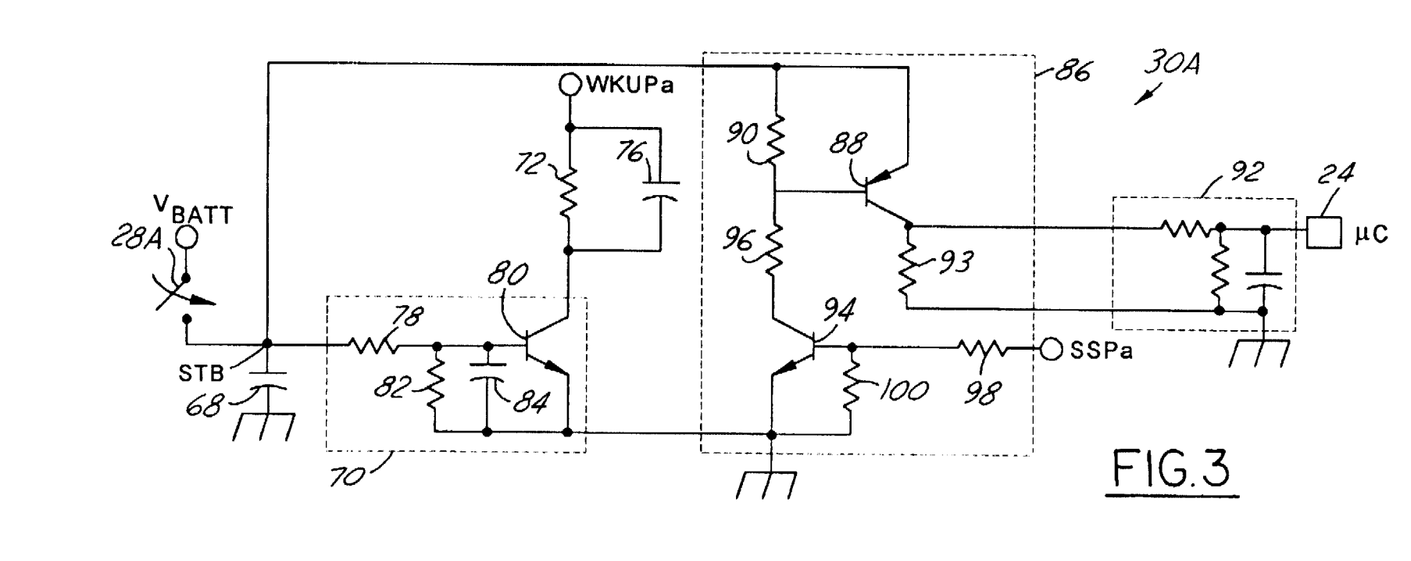

Turning now to FIG. 3, an embodiment of a switch to battery wake-up input circuit which would be associated with any switch to battery wake-up input switch such as 28A or 38A is shown. Using input switch 28A and associated switch to battery wake-up input circuit 30A of remote module 14a as an example, input terminal STB is shown connected to wake-up input switch 28A. RF filtering capacitor 68 is connected between terminal STB and ground. Inverter 70 is in series between terminal STB and resistor 72 which connects to wake-up signal bus 18 at wake-up terminal WKUPa. Capacitor 76 is in parallel with resistor 72. As shown, inverter 70 includes resistor 78 in series between terminal STB and the base of transistor 80. The emitter of transistor 80 connects to ground and the collector to resistor 72. Resistor 82 is in parallel with the base-emitter path of transistor 80. Capacitor 84 is also connected in parallel with resistor 82. One skilled in the art will recognize that inverter 70 allows switch to battery input switch 28A to interface with the standard wake-up block, i.e., resistor 72 in parallel with capacitor 76, as is associated with switch to ground input 281 (see resistor 48 and capacitor 52 in FIG. 2).

Wetting current generator 86 provides current through input switch 28A sufficient to burn any oxide build-up off of the switch contacts. As shown in FIG. 3, wetting current generator 86 includes PNP transistor 88 whose emitter is connected to terminal STB. The base of transistor 88 is connected to terminal STB through resistor 90. The collector of transistor 88 is connected to signal conditioner 92. Signal conditioner 92, which is similar to the signal conditioner described above with reference to switch to ground wake-up input circuit 301, is connected to an input port of microcontroller 24. Resistor 93 is connected in parallel with signal conditioner 92. Accordingly, when transistor 88 is conducting, approximately 10 milliamps of current flows from $V_{BATT}$ to ground through closed input switch 28A, transistor 88 and resistor 93.

Wetting current generator 86 further includes NPN transistor 94 whose collector is connected to the base of transistor 88 through resistor 96. The emitter of transistor 94 is connected to ground. And, the base of transistor 94 is connected to switched system power bus 21 at switched system power terminal SSPa through resistor 98. Resistor 100 is connected in parallel with the baseemitter path of transistor 94.

As described, the outputs of all of the wake-up input circuits are connected to their modules respective wake-up terminal WKUPa–n which are all interconnected via wake-up signal bus 18 to wake-up sensor 40 at terminal WS as shown in FIG. 1.

Figure 4:
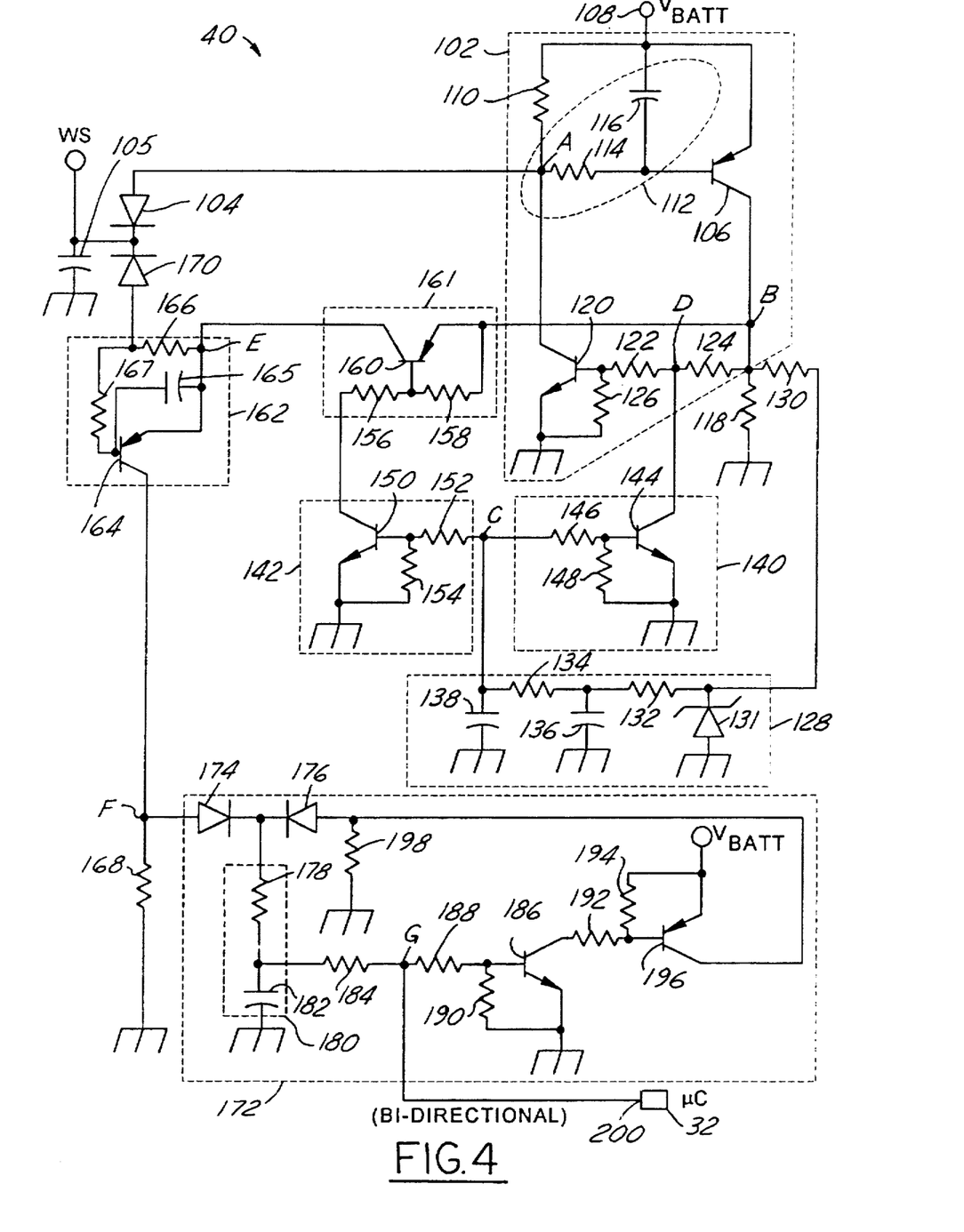

A particular embodiment of wake-up sensor 40 is shown in FIG. 4 wherein input latch 102 is connected to sense terminal WS through blocking diode 104. RF coupling capacitor 105 provides terminal WS with a path to ground. The input to input latch 102 defines node A. Input latch 102 includes PNP transistor 106 whose emitter is connected to the constant source of battery voltage $V_{BATT}$ at terminal 108. Resistor 110 connects in series between the anode of blocking diode 104 and terminal 108. Conventional noise filter 112, which includes resistor 114 and capacitor 116, provides filtering of the latch input signal at the base of transistor 106. The collector of transistor 106 connects to ground through resistor 118. Node B is defined at the output of latch 102; that is at the collector of transistor 106.

Input latch 102 further includes NPN transistor 120 whose collector is also connected to the anode of blocking diode 104 at defined node A. The base of transistor 120 is connected to the collector of transistor 106 (defined node B) through resistors 122 and 124. The emitter of transistor 120 is connected to ground. Pull-down resistor 126 is in parallel with the base-emitter path of transistor 120.

The output of latch 102 connects to time delay circuit 128 via resistor 130. As shown in FIG. 4, time delay circuit 128 essentially consists of a voltage regulator, such as provided by zener diode 131, and a second-order lowpass filter which includes resistors 132 and 134 and capacitors 136 and 138. Obviously other configurations to provide a time delay will come to the minds of those skilled in the art. The output of time delay circuit 128 connects to defined node C between input latch reset circuit 140 and output latch set circuit 142.

In the presently described embodiment, input latch reset circuit 140 includes inverting switching transistor 144. The collector of transistor 144 connects to node D which is defined between resistors 122 and 124. The emitter of transistor 144 connects to ground. Biasing circuitry for transistor 144 includes resistors 146 and 148 which are connected in series between node C and ground. The base of transistor 144 connects between resistors 146 and 148.

Output latch set circuit 142 mirrors input latch reset circuit 140 in that the base of inverting switching transistor 150 connects between biasing resistors 152 and 154. Resistors 152 and 154 also connect in series between node C and ground. In the preferred embodiment, output latch set circuit 142 is designed with a slightly lower threshold voltage than input latch reset circuit 140. The purpose for the varying threshold voltages will become apparent later herein when the operation of wake-up sensor 40 is described.

Continuing with FIG. 4, biasing circuitry for transistor 150 includes resistors 156 and 158 which are in series between node B and the collector of transistor 150. The base of PNP transistor 160 connects between resistors 156 and 158. Together, transistor 160 and resistors 156 and 158 create diagnostic current transient generator 161 whose operation will be described later herein. The emitter of transistor 160 is connected to node B and the collector (i.e., the output of diagnostic current transient generator 161) is connected to current detector 162 as shown in FIG. 4.

Diagnostic current transient detector 162 includes PNP transistor 164 whose emitter is connected to the collector of transistor 160 at defined node E. The emitter of transistor 164 also connects to its own base through filtering capacitor 165 which is in parallel with the series combination of current sensing resistor 166 and resistor 167. The collector of transistor 164 also has a path to ground through resistor 168. The anode of blocking diode 170 connects to the output of biasing circuitry which includes resistors 166 and 167. The cathode of blocking diode 170 connects to wake-up sense terminal WS. The output of diagnostic current transient detector 162 (defined node F) connects to output latch 172 at the anode of steering diode 174.

In the presently described embodiment, output latch 172 further includes steering diode 176 whose cathode is connected to the cathode of steering diode 174 . Resistor 178, which connects at one end between the cathodes of steering diodes 174 and 176, forms noise filter 180 in conjuction with capacitor 182. The output of noise filter 180 connects to current limiting resistor 184 which feeds the base of switching transistor 186. Resistors 188 and 190 provide the biasing of switching transistor 186.

The collector of transistor 186 connects to biasing circuitry which includes resistors 192 and 194. The base of PNP transistor 196 connects between resistors 192 and 194. The emitter of transistor 196 is supplied by battery voltage $V_{BATT}$. The collector of transistor 196 feeds back to the anode of steering diode 176. The collector also has a path to ground through resistor 198. Finally, node C is defined at the output of output latch 172 which connects to a bi-directional interrupt port 200 of microcontroller 32 which is located in power control module 12.

Having described the various components and interconnections of automobile electrical system 10, and in particular the system wake-up) interface, the operation of the wake-up interface in awakening electrical system 10 from its inactive state will now be described.

Returning to FIG. 1, when electrical system 10 is in the inactive state (i.e. power relay 22 is open), battery power is delivered only to power control module 12. As described above, battery 20 provides continuous battery voltage $V_{BATT}$ to wake-up sensor 40. Preferably, continuous power is also applied in a known manner to the keep-alive memory of microcontroller 32 in power control module 12 so that data transferred from remote microcontrollers 24 to the keep-alive memory in microcontroller 32 prior to system shutdown can be retained. An advantage is thereby obtained of retaining data while system 10 is inactive for later transfer back to the remote microcontrollers 24 once the system is awoken. A further advantage is that minimal current is drawn from vehicle battery 20 because power control module 12 draws only enough current (approximately 30 microamps) to keep the memory of microcontroller 32 active while power bus 21 is electrically decoupled from battery 20.

Electrical system 10 is awoken from its inactive state in response to the activation of any of the input switches 28A–I or 38A–I. Upon closure of any input switch, the respective wake-up input circuit generates a wake-up signal which is transmitted to wake-up sensor 40 via wake-up signal bus 18. In response to the switch closure, wake-up sensor 40 transmits a wake-up command to awaken microcontroller 32 in power control module 12 from its sleep mode. Once fully active, microcontroller 32 in power control module 12 generates a power relay control signal in a known manner to close power relay 22 and thereby provide power to remote modules 14a–n. After remote microcontrollers 24 are initialized, electrical system 10 is fully awake and each of power control module 12 and remote modules 14a–n can interrogate its respective local inputs and execute according to its normal operating strategy.

In the presently described embodiment, wake-up sensor 40 senses current transients which are generated upon closure of an input switch by its respective wake-up input circuit. For example, at the instant switch to ground input switch 28I is closed, to , a current path from battery to ground is provided through resistor 110, blocking diode 104, wake-up bus 18, capacitor 52, diode 46 and switch to ground input switch 28I (see FIGS. 2 and 4). The initial surge of current through capacitor 52 generates a current transient of about 20 milliamps at wake-up terminal WKUP. Once capacitor 52 charges, resistor 48 limits current at a steady state value of about 60 microamps.

An advantage of generating the initial current transient upon closure of an input switch is that an initial slug of wetting current is provided to break away any oxide build-up on the switch contacts. Once switched system power is enabled, continuous wetting current to prevent oxide build-up on switch contacts is sourced to wake-up input switches 28A–I and 38A–I from power bus 21 via current generator 86 in the case of a switch to battery input switch (see FIG. 3) or through resistor 64 in the case of a switch to ground input switch.

One skilled in the art will recognize that once switched system power is enabled, continuous wetting current can be provided to nonwake-up input switches 28J–Z and 38J–Z in a manner similar to that just described for wake-up input switches 28A–I and 38A–I. For example, continuous wetting current can be supplied for switch to battery nonwake-up input switch 28J by interfacing the switch to its respective microcontroller input port via interface circuitry 202 (see FIG. 1) which preferably includes an RF coupling capacitor, a wetting current generator and a signal conditioner similar to RF coupling capacitor 68, wetting current generator 86 and signal conditioner 92 (see FIG. 3). Similarly, for switch to ground nonwake-up input switch 28Z, continuous wetting current can be supplied by interfacing switch to ground nonwake-up input switch 28Z to its respective microcontroller input port via interface circuitry 204 (see FIG. 1) which preferably includes an RF coupling capacitor, a pull-up resistor to switch system power (SSP) and a signal conditioner similar to RF coupling capacitor 44, pull-up resistor 64 and signal conditioner 56 (see FIG. 2).

Once switch to ground input switch 28I is reopened, resistor 48 discharges capacitor 52. In the event input switch 28I becomes stuck closed, diode 46 prevents a current path which would charge capacitor 52 in the other parallel wake-up input circuits. An advantage is thereby obtained of preventing a stuck switch condition from disabling the wake-up feature by preventing the generation of current transients upon the closure of another parallel input switch. A further advantage of the presently described embodiment is that in the event of a stuck switch, minimal current is drawn by the stuck switch because of the current limiting provided by resistor 48.

The switch to battery input circuit of the present embodiment similarly generates a current transient which is sensed by wake-up sensor 40 upon the closure of a switch to battery input switch. For example, at the instant input switch 28A is closed, to, transistor 80 turns on. As a result, a path from battery to ground is provided through resistor 110, diode 104, capacitor 76, and conducting transistor 80. As described above, the initial surge of current through capacitor 76 creates a current transient which is detectable by wake-up sensor 40 as will be described below in greater detail. Also similar to resistor 52 in switch to ground wake-up input circuit 301 (see FIG. 2), resistor 72 discharges capacitor 76 when switch to battery input switch 28A is reopened. The base-emitter junction of transistor 80 protects against a stuck switch condition in a manner similar to diode 46 in switch to ground wake-up input circuit 301 as described above.

In the presently described embodiment, wake-up sensor 40 is designed to generate the wake-up command signal is response to a rapid change of current such as that caused by a switch closure and ignore relatively slow changes. It is not desirable that wake-up sensor 40 react to every current transient which may result from a switch closure or may simply be generated by electrical noise. To accomplish the task of distinguishing between noise and an actual switch activation, wake-up sensor 40 uses latches 102 and 172 in combination with noise rejection filter 112 and time delay circuit 128.

Figure 5:
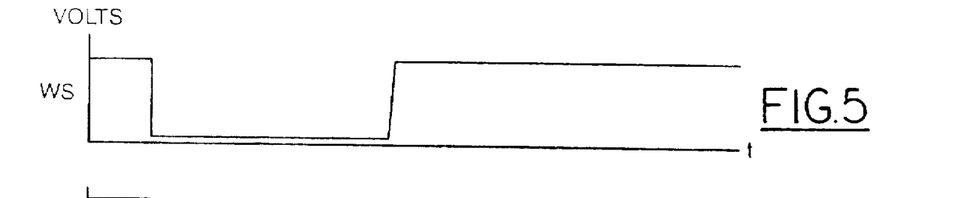
FIG. 5 is a graphical representation of voltage vs. time at defined nodes in the portion of the embodiment shown in FIG. 4.
Figure 5A:
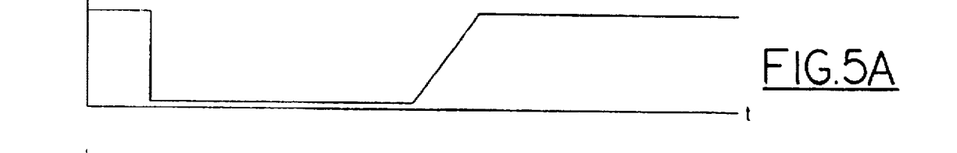
Figure 5B:
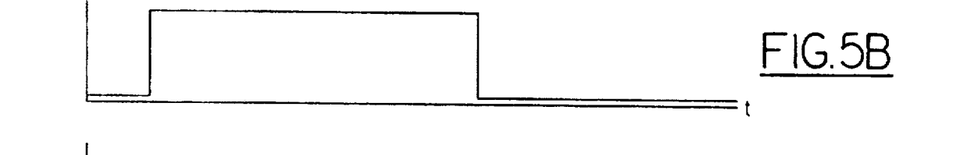
Figure 5C:
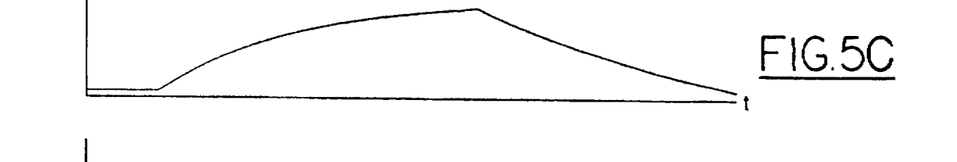
Figure 5D:
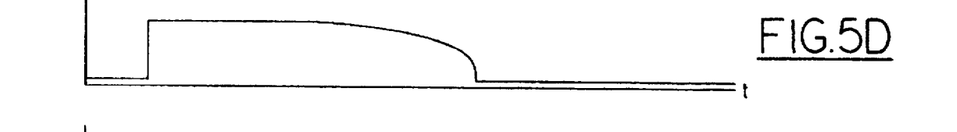
Figure 5E:
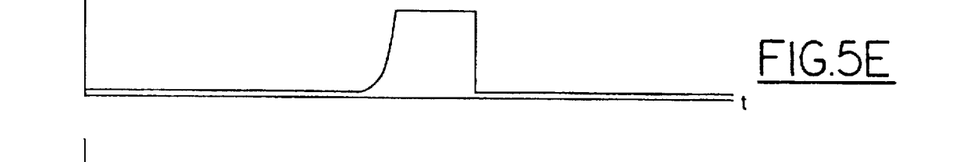
Figure 5F:
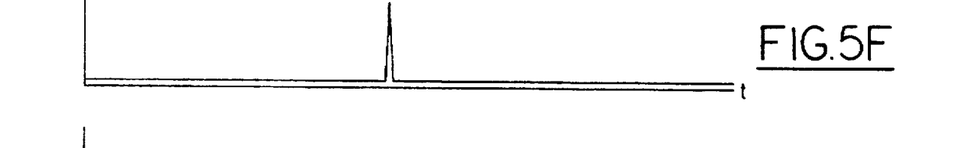
Figure 5G:
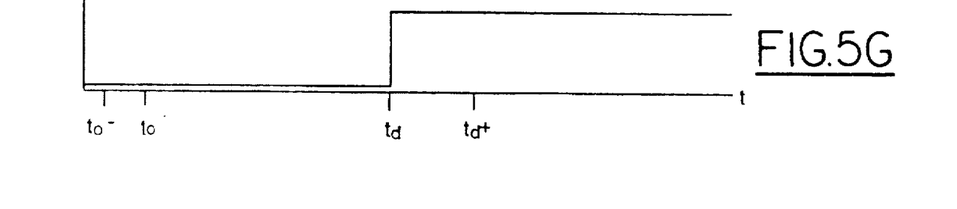

The operation of sensor 40 in generating the wake-up command signal upon the activation of a switch closure will now be described with concurrent reference to FIGS. 4 and 5. FIG. 5 is a timing diagram which shows the state of voltage (i.e. high or low) at terminal WS and each of the defined nodes A–F as a function of time.

Prior to switch activation, $t_{o-}$, sensor 40 is in a ready state wherein neither latch is operating. As shown in FIG. 5, terminal WS and node A is at a high voltage state while nodes B–G are low. At the instant an input switch is closed, $t_{o-}$, terminal WS is pulled low and the current transient turns on transistors 106 and 120 and causes the output of input latch 102 to latch high (see nodes B and D).

Once input latch 102 latches at a high voltage state, the output voltage of time delay circuit 128 begins to ramp up (see node C). Once the output of time delay circuit 128 reaches the threshold voltage of output latch set 142, transistor 150 turns on. At that time, $t_d$, input latch 102 stays latched (see Node B) to provide a constant voltage source to diagnostic current transient generator 163. When transistor 150 turns on, output latch set 142 causes transistor 160 to conduct and thereby generate a diagnostic current transient if the input switch is still closed (see node E). This diagnostic current transient is then detected by current transient detector 162 which triggers output latch 172 to latch to a high voltage state (see nodes F and G). This low to high transition state at the bi-directional interrupt port of microcontroller 32 (node G) causes microcontroller 32 to awaken from its sleep mode. At the time input latch reset 140 reaches its threshold voltage, $t_{d+}$, transistor 144 turns on so that input latch 102 is released back to a low voltage state (see nodes B and D).

In the present example, the duration of the time required to reach the threshold voltage of output latch set 142 is set by the time constant of second-order low-pass filter 128. Preferably, the duration of the time delay is set to an amount, such as 20 milliseconds, which will ignore fast transients that are more likely to be noise rather that an actual switch closure. Accordingly, while input latch 102 will latch on a noise spike which exceeds its filtering capability, output latch 172 will not latch unless the duration of the low state exceeds the requisite time delay such that the diagnostic current transient is generated. And, if the diagnostic current transient is not generated, then output latch 172 will not latch and the wake-up command signal will not be generated at interrupt port 200 to awaken microcontroller 32.

Obviously other timing delay schemes are possible without departing from the scope of the present invention. However, an advantage is obtained by using an analog timer with analog components. For example, a digital timer would require 5 volt regulated power to operate. In such a circuit, additional current would be drawn from battery 20 during the inactive state.

Returning to FIG. 1, after awakening from its sleep state and initializing, microcontroller 32 in power control module 12 preferably first powers up internal voltage sources in power control module 12 to power onboard integrated circuits such as power relay driver 42. Once power control module 12 is fully active, power control microcontroller 32 enables relay driver 42 to close power relay 22 and provide power to remote modules 14a–n at respective terminals SSPa–n via switched system power bus 21.

Each remote microcontroller 24 then undergoes a similar initialization and then interrogates its respective input switches 28A–I to determine which switch was closed to activate electrical system 10. Preferably, each remote microcontroller 24 also communicates with microcontroller 32 in power control module 12 over serial communication link 16 to transfer any data stored prior to shutdown necessary to execute its normal operating strategy. Once electrical system 10 is fully awake, microcontroller 32 in power control module 12 releases output latch 172 by pulling bi-directional interrupt port 200 low.

When a particular remote module, after interrogation of its inputs or execution of its normal operating strategy, determines that it can return to a sleep state, it sends a sleep request to microcontroller 32 in power control module 12 over serial communication link 16. Once microcontroller 32 in power control module 12 has received sleep requests from each remote microcontroller 24 and has transferred all data which must be retained, electrical system 10 can enter its sleep mode. Accordingly, microcontroller 32 in power control module 12 disables power relay driver 42 and power relay 22 disengages.

This concludes the description of the present embodiment. The reading of it by those skilled in the art will certainly bring to mind many alterations and modifications without departing from the spirit and scope of the invention. For example, while the present embodiment has been described with reference to microcontrollers, the present invention may also be used to advantage using any number of combinations of digital and analog devices commonly known in the art. Accordingly, the function performed by the circuits of the present invention is independent of the technology and structure of the circuits to which it is connected.

It is further important to note that a system embodying the present invention is not limited to a single power relay. Any number of remote modules may be grouped together and tied to a power relay so that power may be selectively coupled to that particular grouping. Similarly, in a particular application, it may be desirable to provide a continuous supply of power to a particular remote module, while others are selectively powered.

Obviously the combinations are endless. Accordingly, it is intended that the scope of the invention be limited to only the following claims.

What is claimed is:

1. An electrical system for controlling a plurality of vehicle functions in an automobile comprising:

at least one remote module coupled to a power bus and a signal bus; said remote module coupled to at least one wake-up input switch; and a central module coupled to said remote module by said signal bus, said central module controlling electrical power from a power source to said power bus in response to a detection of an activation of said wake-up input switch thereby coupling power to said remote module.

2. An electrical system according to claim 1 wherein said remote module includes wake-up input switch interface means interposed between said at least one wake-up input switch and said signal bus for generating a current transient in response to said activation of wake-up input switch.

3. An electrical system according to claim 2 wherein said central module includes sensing means coupled to said signal bus for detecting said current transient and causing said power to be coupled to said remote module.

4. An electrical system according to claim 3 wherein said central module further includes central controller means responsive to said sensing means for controlling distribution of said electrical power to said power bus.

5. An electrical system according to claim 2 wherein said remote module further includes remote controller means; and said wake-up input switch is also coupled to an input of said remote controller means; said remote controller means responsive to said wake-up input switch for controlling assigned vehicle functions.

6. An electrical system according to claim 5 wherein said remote module further comprises at least one nonwake-up input switch coupled to another input of said remote controller means; said remote controller means responsive to both said at least one wake-up input switch and said at least one nonwake-up input switch for controlling assigned vehicle functions.

7. An electrical system according to claim 6 wherein at least one nonwake-up input switch coupled to an input of said central controller means; and said central module further includes interface means for coupling said wake-up input switch to both said sensing means and an input of said central controller means; said central controller means responsive to both said wake-up input switch and said nonwake-up input switch for controlling assigned vehicle functions.

8. An electrical system according to claim 3 further comprising power control means responsive to a power control signal generated by said central module for electrically connecting said power bus and said power source.

9. An electrical system according to claim 2 wherein said wake-up input switch interface means further includes wetting current means coupled to said power bus for providing wetting current to each of said input switches when closed for removing oxides from contacts of each of said input switches.

10. An electrical system according to claim 2 wherein said interface means includes means for protecting against a stuck switch condition.

11. An electrical system for controlling a plurality of vehicle functions in an automobile comprising:

at least one remote module having wake-up input switch interface means coupled to a wake-up input switch for generating a current transient upon closure of said wake-up input switch;

a central module having wake-up sense means for sensing said current transient;

a wake-up signal bus coupling said wake-up sense means to said wake-up input switch interface means;

a power bus coupled to said remote module; and power control means responsive to said wake-up sense means for coupling said power bus to a power source.

12. An electrical system according to claim 11 further comprising a data bus for transferring data between said central module and said remote module.

13. An electrical system according to claim 11 wherein said power control means includes a power relay driver for generating a relay signal and a power relay responsive to said relay signal.

14. A method for awakening an automotive electrical system from an inactive state, the electrical system having a central module for coupling power from a power source to a power bus, a plurality of remote modules coupled to the power bus, and each remote module respectively coupled to at least one corresponding wake-up input switch, the method comprising the steps of:

generating a current transient upon activation of one of said wake-up input switches;

sensing said current transient;

generating a power control signal in response to said sensed current transient; and coupling power to the power bus in response to said power control signal.

15. The method according to claim 14 wherein said step of providing power to said remote modules includes the step of closing a power relay responsive to said power control signal.

16. The method according to claim 14 further comprising the step of transferring data from the central module to said remote modules via a data bus.

17. The method according to claim 16, wherein the automotive electrical system enters an inactive state, comprising the steps of:

generating a sleep request for each remote module;

receiving said sleep request from each remote module at said central module;

decoupling power from the power bus in response to receiving said sleep request from all remote modules.

18. The method according to claim 17 further comprising the step of transferring data from said remote modules to the central module prior to said step of decoupling power to said remote modules.

* * * * *